Figure 1:
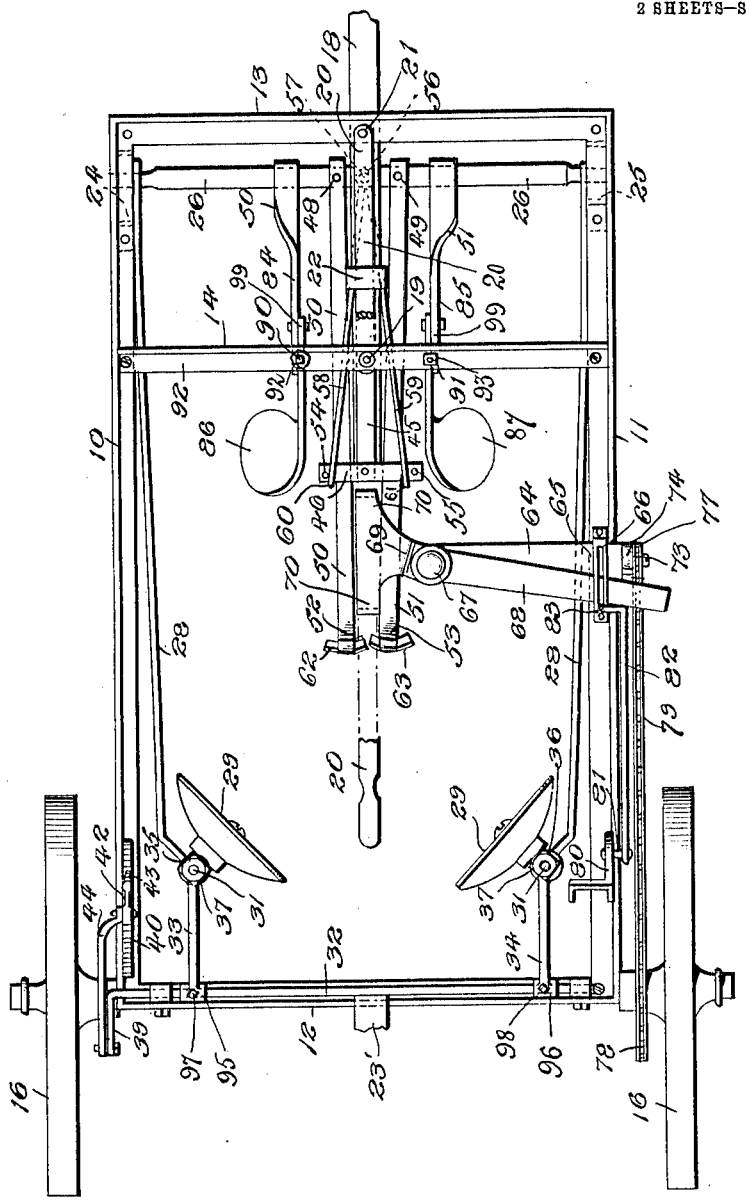

A. O. YEATMAN.
COTTON CHOPPER.
APPLICATION FILED NOV. 6, 1912.

1,090,005.

Patented Mar. 10, 1914.
2 SHEETS—SHEET 1.

Witnesses

Inventor
A. O. Yeatman

By

Attorneys

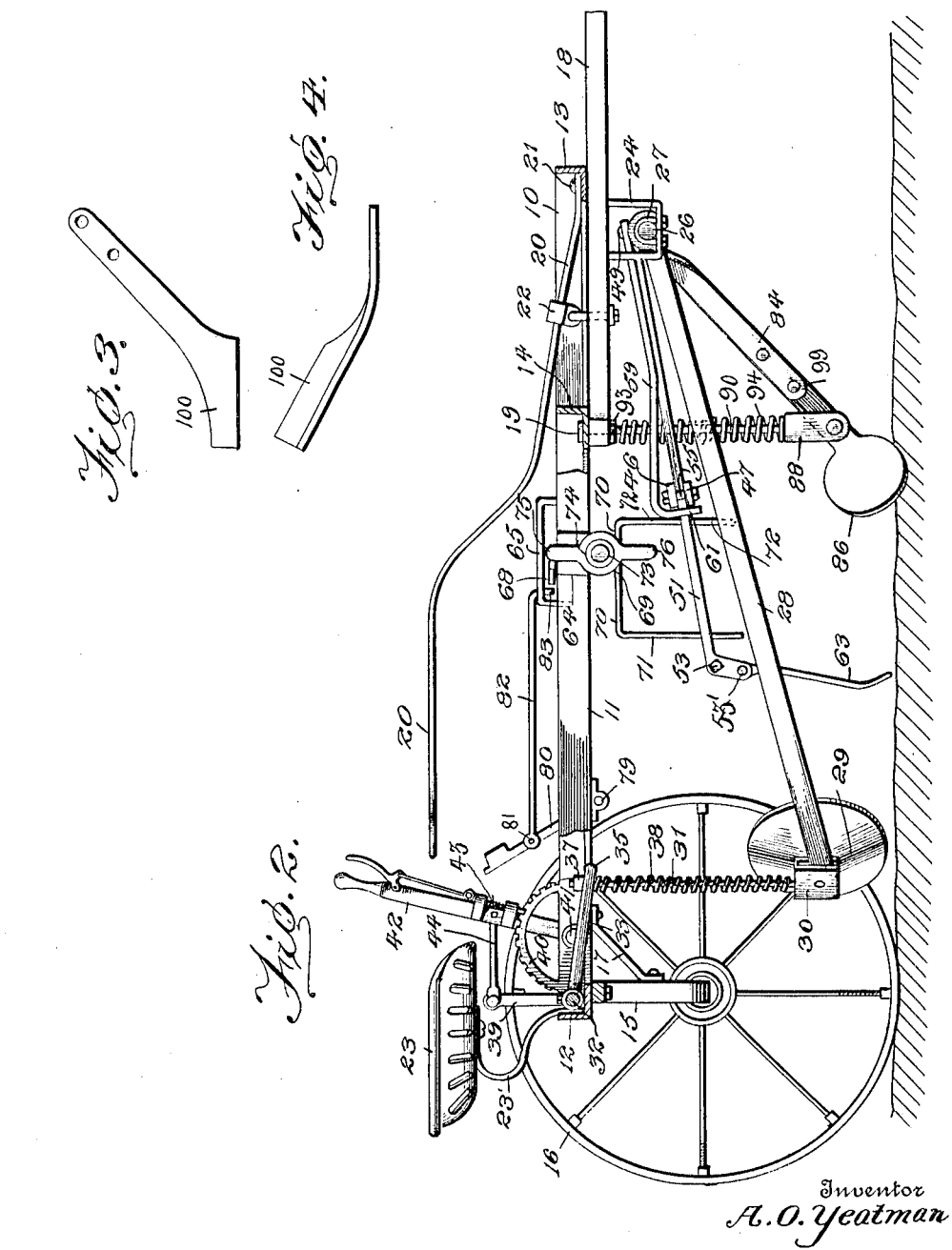

UNITED STATES PATENT OFFICE.

ALFRED O. YEATMAN, OF VICI, OKLAHOMA.

COTTON-CHOPPER.

1,090,005. Specification of Letters Patent. Patented Mar. 10, 1914.

Application filed November 6, 1912. Serial No. 729,885.

*To all whom it may concern:*

Be it known that I, ALFRED O. YEATMAN, citizen of the United States, residing at Vici, in the county of Dewey and State of Oklahoma, have invented certain new and useful Improvements in Cotton-Choppers, of which the following is a specification.

This invention relates to improvements in combined cultivators and cotton choppers, and has for one of its objects to improve the construction and increase the utility and efficiency in a device of this character.

Another object of the invention is to provide a simply constructed device whereby cotton plants may be cultivated and likewise "thinned" by cutting out plants at certain predetermined intervals.

Another object of the invention is to provide a simply constructed device whereby the depth of cut of the cultivator portion of the improved device may be controlled from the seat of the driver without stopping the operation of the machine.

Another object of the invention is to provide a simply constructed device whereby the operation of the chopping portion of the improved device may be stopped without interfering with the operation of the cultivator portion.

Another object of the invention is to provide a simply constructed device having an improved means for steering the same without stopping the operation of the cultivator or chopping portions.

With these and other objects in view the invention consists in certain novel features of construction which will be hereinafter first fully described and then more specifically pointed out in the claims, and in the drawings of the preferred form of the invention; Figure 1 is a plan view of the improved apparatus; Fig. 2 is a side elevation partly in section; Fig. 3 is a side view of a modified form of one of the coverers or sweeps; Fig. 4 is a plan view of the member shown in Fig. 3.

Corresponding and like parts are referred to in the following description and indicated in all the views of the accompanying drawings by the same reference characters.

The main frame of the improved device is preferably oblong and includes spaced side members 10—11, end members 12—13 and an intermediate transverse member 14. The frame may be constructed of any suitable material but is preferably formed of metal L bars suitably riveted or otherwise connected.

The rear axle of the improved device is preferably of the arching form as shown at 15 and provided with axle journals to receive relatively large rear bearing wheels 16. The axle 15 is bolted or otherwise secured beneath the rear member 12 of the frame and is preferably provided with diagonal braces 17.

The draft tongue of the improved device is represented as a whole at 18 and is pivoted at 19 to the transverse member 14. A steering lever 20 is pivoted at 21 to the forward member 13 of the frame and loosely coupled by a clip device 22 to the tongue between the pivots 19 and 21. The lever 20 extends rearwardly and is curved as shown and terminates near the seat of the driver. By this means it will be obvious that the tongue may be readily swung upon its pivot 19 to control the direction of movement of the device. The seat of the improved device is of the usual form and represented conventionally at 23, and mounted upon the frame member 12 by a standard 23'.

Depending from the side members 10—11 of the frame near their forward ends are brackets 24—25, and connected in these brackets is a transverse bar or supporting member 26. The member 26 is connected in any suitable manner to the brackets 24—25, as for instance, by U-bolts or like devices 27.

Mounted to swing at their forward ends to the member 26 are coacting cultivator beams 28, each having a disk cultivator member 29 mounted for rotation respectively upon its inner end. The beams 28 are spaced apart at their forward ends a distance corresponding substantially to the width of the supporting frame and are curved inwardly slightly at their rear ends so that the disks 29 are caused to assume reversely oblique positions at opposite sides of the center line of the frame. Connected to each of the beams 28 is a strap or cleat 30 from which a rod 31 rises, as shown.

Mounted for rotation upon the rear frame member 12 is a rock shaft 32 having forwardly and upwardly directed arms 33—34. The arms terminate at their rear ends in collars 95—96 slidable upon the shaft 32 and adapted to be coupled to rotate therewith by set screws 97—98. At their forward ends the arms terminate in eyes 35—36 through which the rods 31 extend. By this means the arms and the rods carried thereby may be adjusted longitudinally of the shaft 32 and clamped in this adjusted position. The rods are threaded at their upper ends to receive adjusting nuts 37, and each rod is provided with a spring 38 which bears between the strap or cleat 30 and the lower side of the eye portions 35—36 of the arms 33—34.

At one end the shaft 32 is provided with a rearwardly and upwardly extending offset 39. A notched segment 40 is connected to one of the longitudinal frame members, for instance the frame member 10, and pivoted at 41 to the segment is a lever arm 42 having a spring-controlled pawl 43 engaging in the notches of the segment. A rod 44 connects the lever 42 with the offset 39. By this simple arrangement it will be obvious that by actuating the lever 42 the cultivator bars 38 may be adjusted vertically to control the depth of cut of the disks 29, and by adjusting the arms 33 upon the shaft 32, the distance apart of the members 29 may also be controlled.

Connected at one end to the member 26 is a plate 45 which extends rearwardly and is provided with transverse guide plates 46—47 connected thereto at their upper and lower faces and extending laterally. Pivoted at 48—49 to the member 26 at each side of the plate 45 are beam members 50—51 which extend rearwardly and between the guide members 46—47 and are directed downwardly at their inner ends as shown at 52—53. The members 46—47 are provided with pins 54—55 to limit the outward movement of the beams 50—51. A spring is coiled at 56 around a holding pin 57 in the plate 45 and thence extended, as shown at 58—59, and directed downwardly at 60—61 to bear against the outer edges of the beams 50—51 and thus operates to hold the beams yieldably in their inward positions or against the side edges of the plate 45. The downward-turned terminals 52—53 of the beams 50—51 are provided with "chopper" blades 62—63 and with breaking pins 53' of wood or like material.

Connected to one of the longitudinal frame members, for instance, the frame member 11, is a bracket 64, and extending over the bracket at its inner end is a combined guard and guide 65 having a longitudinal slot 66. Pivoted at 67 to the bracket 64 is a lever device comprising a body portion 68 which extends outwardly over the bracket 64 and through the guide 65. At its inner end the body 68 is down-turned as shown at 69 and thence extended laterally as shown at 70, the lateral portion being down-turned at its ends as shown at 71—72 and extending by the down-turned portions between the beams 50—51. The down-turned portions 71—72, it will be noted, are spaced a considerable distance apart so that when the lever device is vibrated upon its pivot 67 the portions 71—72 will operate to separate the beams 50—51 against the resistance of the springs 58—59, and then when the lever device is released the springs will return the beams to their normal inward positions. At its outer end the bracket 64 is down-turned to carry a stub shaft 73 upon which a tappet device 74 is mounted for rotation. The tappet device includes radial lugs 75—76 and is likewise provided with a small chain pinion 77. Connected to one of the bearing wheels 16 is a chain wheel 78 from which a chain 79 leads to the sprocket 77. By this means the motion of the drive wheel is communicated to the tappet device for intermittently operating the lever device 68. Pivoted at 79 to the frame member 11 is a foot lever 80. Pivoted at 81 to the foot lever is a rod 82 having a down-turned terminal 83 at its free end and extending through the slot 66 and into the path of the body portion 68 of the lever device. By this arrangement when the foot lever 81 is in its rearward position the down-turned terminal 83 of the rod 82 is maintained at the rear end of the slot 66 and out of engagement with the body 68 of the lever device, but when the foot lever 80 is pushed forward by the foot of the operator the down-turned portion 83 of the lever will "pick up" the outer end of the lever device and move it into its forward position and thus cause the down-turned portion 71—72 of the lever device to spread or separate the beams 50—51 to hold them in separated position and out of the path of the tappet 75—76 so long as the foot of the operator remains in engagement with the lever 80. By this means the choppers 61—63 may be held out of operative position and caused to pass the plants without producing any effect thereon. This is an important advantage in devices of this character and enables the driver or operator to skip certain of the plants and not "chop" them, when desired.

Mounted to swing upon the member 36 at opposite sides of the beams 50—51 are other smaller beams 84—85, the beams being preferably formed of bars twisted toward their rear ends and terminating in cultivator shovels 86—87, the latter shovels being arranged to throw the earth outwardly while the disks 29 are arranged to throw the earth inwardly. The beam 84 is provided with a strap or cleat 88 while the beam 85 is provided with a similar strap or cleat. A rod 90 rises from one of the cleats 88 while a similar rod 91 rises from the other cleat. The rods are threaded at their upper ends and extend through the transverse member 14 and are provided with adjusting nuts 92—93 upon their upper ends. Springs 94 surround the rods 90—91 and bear upon the cleats 88 and against the outer side of the member 14 and thus exert their force to maintain the beams 84—85 in their downward positions. The springs 38—94 are of sufficient strength to maintain the cultivator beams in their downward positions with sufficient force to resist normal upward strains but which will yield if the cultivator shovels meet with obstructions which would otherwise fracture or break them and thus prevent breakage of the parts.

The sizes of the wheels 16, gear 78 and pinion 77 are so gaged and proportioned as to cause the lever device 68 to operate at proper intervals to produce the requisite chopping action, and thus leave the growing plants at proper intervals. The beams 84 are jointed, as shown at 99, so that shovels or "sweeps" of various forms may be substituted for the shovels or disks 86—87, as for instance the sweeps 100 as shown in Figs. 3 and 4.

The improved device is simple in construction, can be strongly and durably manufactured, and operates effectually for the purpose described.

Having described the invention, what I claim is:

1. In a device of the class described, a supporting frame, coacting members pivoted to said frame and provided with cutters, a means operating to yieldably maintain said coacting members with the cutters normally in close relation, a lever device pivoted to said frame and including downwardly directed spaced terminals extending between said coacting members, and means for imparting motion intermittently to said lever to cause a corresponding intermittent action of the cutters.

2. In a device of the class described, a supporting frame having bearing wheels, coacting members pivoted to said frame and provided with downwardly directed cutters, a spring operating to yieldably maintain said coacting members with the cutters normally in close relation, a lever device pivoted to said frame and including downwardly directed spaced terminals extending between said coacting members, and means for imparting the motion of said bearing wheels intermittently to said lever device.

3. In a device of the class described, a supporting frame including a forward member suspended below the body of the same, a plate rigidly connected to said forward frame member, combined guide and guard members connected to said plate and extending laterally thereof, coacting members pivoted to said forward frame member and extending between said combined guide and guard members and provided with downwardly directed cutters, a spring operating to yieldably maintain said coacting members with the cutters normally in close relation and against said plate, a lever device pivoted to said frame and including downwardly directed terminals spaced apart and extending between said coacting members, and means for imparting motion intermittently to said lever device.

4. In a device of the class described, a supporting frame including a forward member suspended below the body of said frame, a plate connected rigidly to said forward frame member, combined guide and guard members connected to said plate and extending laterally of the same, coacting members pivoted to said forward frame member and extending between said guide and guard members and having cutters at their free ends, a spring operating to yieldably maintain said coacting members with the cutters normally in relatively close relation, and means for intermittently spreading said coacting members against the resistance of said spring.

5. In a device of the class described, a supporting frame including a forward member suspended below the body of said frame, coacting members pivoted to said forward frame member and provided with downwardly directed cutters, a spring operating to yieldably maintain said coacting members with the cutters normally in relatively close relation, a lever device swinging from said frame and with downwardly directed terminals spaced apart and extending between said coacting members, means for imparting motion intermittently to said lever, and means for holding said lever out of the path of said motion imparting means.

6. In a device of the class described, a supporting frame including a forward member suspended below the body of said frame, coacting members pivoted to said forward frame member and provided with downwardly directed cutters, a spring operating to yieldably maintain said coacting members with the cutters normally in relatively close relation, a lever device swinging from said frame and with downwardly directed terminals spaced apart and extending between said coacting members, a keeper having a longitudinal slot and bearing over said lever, a rod having a downward turned terminal extending through the slot and into the path of said lever, and means under the control of the operator for actuating said rod to hold said lever device out of the path of said motion imparting means.

In testimony whereof I affix my signature in presence of two witnesses.

ALFRED O. YEATMAN. [L. S.]

Witnesses:
J. N. HOUSER,
THOS. HUTCHINSON.

Copies of this patent may be obtained for five cents each, by addressing the "Commissioner of Patents, Washington, D. C."